Feb. 24, 1970     D. N. CORNISH     3,496,773

LIQUID LEVEL GAUGES

Original Filed May 18, 1967

United States Patent Office 3,496,773
Patented Feb. 24, 1970

3,496,773
LIQUID LEVEL GAUGES
Donald Nelson Cornish, Newbury, England, assignor to United Kingdom Atomic Energy Authority, London, England
Continuation of application Ser. No. 639,448, May 18, 1967. This application Nov. 21, 1968, Ser. No. 777,922
Claims priority, application Great Britain, May 26, 1966, 23,740/66
Int. Cl. G01f 23/00
U.S. Cl. 73—295         5 Claims

ABSTRACT OF THE DISCLOSURE

A liquid level gauge for cold liquids comprises a wire of superconducting material adapted to be immersed in a liquid having a temperature below that at which the wire becomes superconducting. The wire is of a length slightly in excess of maximum depth of the liquid. A circuit including a power source and a meter is provided for passing an electrical current through the wire and for measuring the resistance of the wire. A device for initiating normality is positioned at the upper end of said wire.

---

Figure 1:
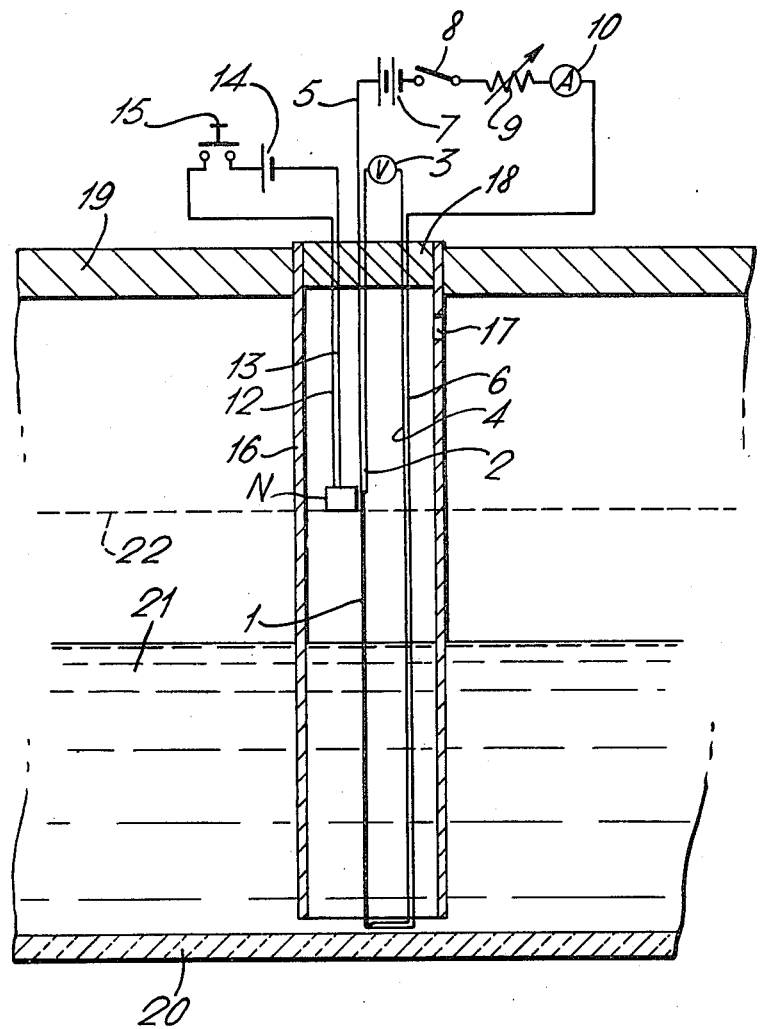

This application is a continuation of my copending previous application Ser. No. 639,448, filed May 18, 1967, now abandoned.

The present invention relates to liquid level gauges and more particularly to gauges suitable for use in cryostats containing a liquid, such as liquid helium, at a temperature sufficiently low to induce superconductivity in a superconducting material immersed in the said liquid.

A liquid level gauge for cold liquids has been proposed comprising a loop of superconducting material, means for passing on electrical current through the loop and means for measuring the resistance of the loop. The section of the loop immersed in the liquid, typically liquid helium, is superconducting and has no resistance, whilst, due to the current passing through it, the section of the loop above the liquid will be normal and will have a measurable resistance dependent on the length of the section of the loop which is above the liquid. A fall in the liquid level from the maximum is indicated by a fractional increase in the total resistance of the superconductor.

It is an object of the present invention to provide a new or improved liquid level gauge.

According to the present invention there is provided a liquid level gauge for cold liquids comprising a wire of superconducting material adapted to be immersed in a liquid having a temperature below that at which the wire becomes superconducting, said wire being of a length slightly in excess of maximum depth of the liquid, means for passing an electrical current through said wire, means for measuring the resistance of said wire and means for initiating normality at the upper end of said wire.

The means for initiating normality is conveniently a heating coil but it will be appreciated that normality may be initiated by other means, for example, a suitable magnetic field.

In use one end of the wire would be located at the bottom of the vessel containing the cold liquid, for example, liquid helium, and, with the liquid at its maximum level, a short length, about 1 cm., of the wire would extend above the liquid surface. A small heating coil may be mounted around this upper end of the wire and would be effective in operation to raise the temperature of the wire above its critical temperature and thereby cause the upper end of the wire to become normal. A current is passed through the wire and is of a value such that the heat generated by its passage through the normal superconductor is sufficient to cause normality to propagate along the wire whilst it is in an atmosphere of gas but is insufficient to cause the normal region to propagate freely along the wire whilst it is immersed in liquid.

The means for passing a current through the wire conveniently comprises a battery and a variable resistor, whereby the current flowing in the circuit may be adjusted to a convenient selected value. A voltmeter may be connected across the ends of the wire and at a given current the potential drop measured by the voltmeter is proportional to the resistance of the wire.

It will be realised that only that part of the wire which is above the liquid level will have a measurable resistance since it is only this section of the wire which is normal. Thus, the measured voltage will be dependent on the amount by which the liquid level has fallen below a predetermined maximum level.

Connections to the superconducting wire should be made using leads of high electrical conductivity, for example copper. The voltmeter may be connected to the wire in a circuit which is separate from that containing the source of current.

It should be appreciated that the heating coil needs to be switched on only for a sufficient time to induce normality at the top of the length of superconductor and that the current flowing through the wire should then be sufficient to ensure propagation of normality in that part of the wire which is above the liquid level, but not in that part of the wire which is below the liquid surface. It will be realised that normality may not extend exactly to the surface of the liquid but to some point slightly above or below the liquid surface and that provided the current is adjusted to the predetermined value the height of this point relative to the liquid level will always be the same. To minimise evaporation of the liquid it is preferred that, if possible, normality should not extend below the liquid surface.

Figure 2:
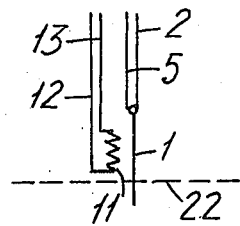
Figure 3:
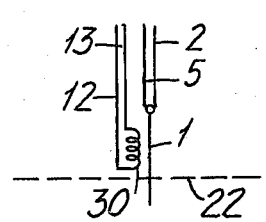

In order that the present invention may more readily be understood, one embodiment thereof will now be described by way of example, reference being made to the accompanying drawings wherein FIGURE 1 is a diagrammatical representation of a liquid level gauge, and wherein FIGURES 2 and 3 show, in enlarged views, different specific embodiments of the portion of FIGURE 1 enclosed in the dash line circle.

The essential part of the gauge is a length of 0.005 inch diameter niobium—25% zirconium, superconducting wire 1. From the top of the wire 1, a copper lead 2 is connected to a voltmeter 3 and a further copper lead 4 connects the meter 3 to the lower end of the wire 1. Further copper leads 5 and 6 are also connected to the top and bottom respectively of the wire 1 and these leads are connected to the supply of current which includes a battery 7, switch 8, variable resistor 9 and ammeter 10.

A means for initiating normality N may comprise either a heating coil 11 as shown in FIGURE 2 or a magnetic coil 30 for creating a magnetic field, as shown in FIGURE 3. The small heating coil 11 about 1 cm. in length is mounted around the top of the wire 1 and this coil 11 is connected through copper leads 12 and 13 to a battery 14 and a push button type switch 15.

The wire 1, coil 11 and the lower ends of leads 2, 4, 5, 6, 12, and 13, are mounted within tube 16 of insulating material, for example polytetrafluoroethylene, having a small aperture 17 near the top end thereof. The leads pass through an electrically insulating plug 18 which closes the top of the tube 17. The whole assembly forms the liquid level gauge which in use is inserted through, and sealed to, an upper covering plate 19 of an insulated vessel 20, such as Dewar vessel, only the bottom of which is shown. The vessel 20 contains a quantity of liquid helium 21, the maximum level of the liquid being indicated by the dashed line 22.

It will be observed that the coil 11 will never be immersed in the liquid helium and it will be appreciated that the coil 11 should be made of a material, such as Nichrome, which has a high electrical resistance at the temperature of the liquid helium, i.e. 4.2° K.

The sequence of operations in using the gauge is as follows. Initially, switches 8 and 15 are open and the wire 1, part of which is immersed in the liquid helium 21, and the remainder of which is surrounded by cold helium vapour, is below its critical temperature of about 11° K. and is therefore superconducting.

The switch 8 is closed and resistor 9 is adjusted to give a current of 0.45 amps in the circuit as measured by the ammeter 10. This current for the wire of the example is insufficient to initiate normality in the wire 1, but is sufficient to ensure that propagation of normality, once this is induced, will occur through the section of the wire 1 above the surface of the liquid 21. Thus, the wire 1 remains superconducting at this time and the voltage registered on the voltmeter 3 is zero.

The switch 15 is then depressed and the coil 11 raises the upper end of the wire to a temperature in excess of its critical temperature whereby this end of the wire goes normal and possesses a finite resistance. The current passing through the wire 1 propagates normality along the wire to a point slightly above or below the surface of the liquid 21. The resistor 9 is adjusted to restore the current, which has fallen as a result of the increased resistance of the wire 1, to a value of 0.45 amps. The switch 15 is released since normality in the wire 1 is being maintained by the current passing through the wire from the battery 7.

The voltage measured by the voltmeter 3 is then proportional to the amount by which the level of the liquid 21 has fallen below the liquid level 22. Thus, since the level 22 is known, the voltage is a measure of the depth of the liquid 21.

If a continuous reading is required, the switch 8 may be maintained in a closed positon, and the current maintained at the required value of 0.45 amps by adjustment of resistor 9. If a continuous reading is not required, however, the switch 8 is opened and in the absence of a current flowing through it, the wire 1 is cooled below its critical temperature and becomes superconducting once more. To obtain a further reading of the liquid level, the sequence of operations described is repeated.

It will be realised that due to the use of copper leads the heat generated in the cryostat is less than in previously proposed liquid level gauges and furthermore, since the temperature of the wire 1 when normal is in the range about 11–20° K., the effect of temperature variations on the resistance of the superconductor is insignificant compared to the same effect in previous gauges.

The accuracy of the gauge is improved relative to gauges used hitherto because the voltmeter reading is proportional to the depth through which the liquid has fallen from the maximum plus the length of wire covered by the heater, typically 1 cm. In previous gauges an additional length of superconducting wire which was of at least sufficient length for the temperature of the superconductor to have exceeded its critical value with no current flowing in it, was needed and this reduced the accuracy of the measurement.

It will be appreciated that, as in previous gauges, in the present gauge there is no power dissipated directly into the liquid since the wire at this point is superconducting. Furthermore, the power transmitted into the liquid by thermal conduction along the wire itself is small.

I claim:
1. A liquid level gauge for cold liquids comprising a wire of superconducting material adapted to be vertically immersed in a liquid having a temperature below that at which the wire becomes superconducting, said wire being of a length slightly in excess of maximum depth of the liquid, means for passing an electrical current through said wire,
 means for measuring the resistance of said wire and means comprising an electrical heating coil mounted adjacent the upper end of said wire for initiating normality at the upper end of said wire above said liquid, and means for energising said coil.

2. A liquid level gauge according to claim 1 wherein the electrical heating coil is formed from Nichrome.

3. A liquid level gauge for cold liquids comprising a wire of superconducting niobium-zirconium material adapted to be vertically immersed in a liquid having a temperature below that which the wire becomes superconducting, said wire being of a length slightly in excess of maximum depth of the liquid and extending lengthwise within an apertured tube of thermally insulating material, electrical input and output leads to the superconducting wire, a switch means, a variable resistance means and current measuring means associated with said leads, means for measuring the potential across said superconducting wire, an electrical heating coil located adjacent the upper end of the said superconducting wire and means to energise said coil and thereby initiate normality at the upper end of the said superconducting wire.

4. A liquid level gauge for cold liquids comprising a wire of superconducting material adapted to be vertically immersed in a liquid having a temperature below that at which the wire becomes superconducting, said wire being of a length slightly in excess of maximum depth of the liquid, means for passing an electrical current through said wire, means for measuring the resistance of said wire and means for initiating normality at the upper end of said wire above said liquid, the last said means being separate from said wire and being operable independently of the current in the wire.

5. A liquid level gauge according to claim 4 wherein the means for initiating normality comprises a means for producing a magnetic field adjacent the upper end of said wire.

References Cited

UNITED STATES PATENTS 3,267,730   8/1966   Satterthwaite et al. _____ 73—295

DONALD O. WOODIEL, Primary Examiner